Feb. 2, 1965   A. ENGQUIST   3,167,936
TORQUE LIMITING DEVICES
Filed Nov. 13, 1961
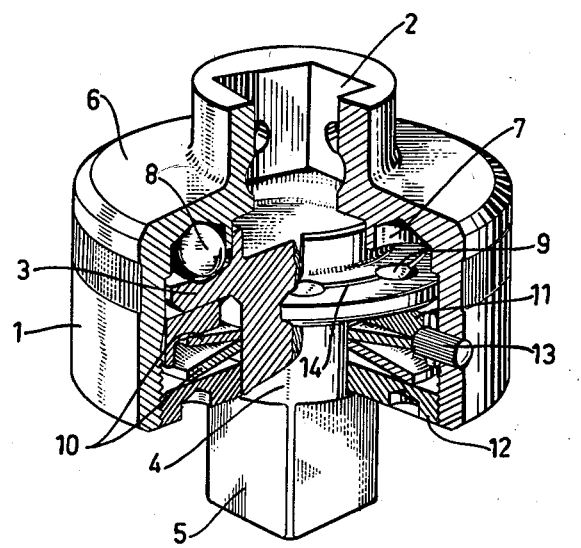
INVENTOR.
Arne Engquist
BY Harry Cohen
His Attorney

United States Patent Office 3,167,936
Patented Feb. 2, 1965

3,167,936
TORQUE LIMITING DEVICES
Arne Engquist, Enkoping, Sweden, assignor to Aktiebolaget Bahco, Stockholm, Sweden, a corporation of Sweden
Filed Nov. 13, 1961, Ser. No. 151,814
Claims priority, application Sweden, Nov. 16, 1960, 11,041/60
2 Claims. (Cl. 64—29)

The present invention relates to a torque-limiting device intended for limiting the torque applied when tightening up bolts, sparking plugs etc., where it is desirable to obtain a predetermined tightening-up torque.

The purpose of this invention is to afford a type of torque-limiting device which is simple and cheap to manufacture, and easily adjustable over a range of torques and maintains a set torque even after a long period of use.

The torque-limiting device of this invention satisfies the above-mentioned requirements, and consists of the following components: a sleeve-formed casing closed at the upper end and provided with a socket for a tightening up tool; a disc-formed member rotating on bearings and having a stud in alignment with but protruding in the opposite direction to the socket, for use with a box spanner, socket wrench or similar tool; one or more balls inserted between the disc-formed member and the roof of the casing which are guided in cavities, provided for the purpose in the roof of the casing, and interact with recesses in the disc-formed component; a friction ring interacting with the opposite side of the disc-formed member, which is movable in the axial direction but is not rotatable in relation to the sleeve-formed casing; a spring compressed between the friction ring and a stop plate at the bottom part of the casing to press the friction ring against the disc-formed member which is at the same time pressed towards the roof of the casing.

These and other characteristic features of the invention are more closely given in the following description and in the attached perspective drawing which is partly sectioned to illustrate the construction.

In the embodiment illustrated, the torque-limiting device consists of an inverted bowl-shaped casing 1, which has an opening 2 at the upper end for the insertion of a tightening-up tool of the type used with conventional box spanners or socket wrenches. In this bowl-shaped casing 1 there is a disc-formed member, rotatable on bearings, and having a stud 4 with a square-shaped end 5, pointing downwards, for use with box spanners etc. One or more balls 8 advantageously three in number, are inserted between the disc-formed member 3 and the roof 6 of the casing 1 and are retained and guided in respective cavities 7, drilled for the purpose to a depth greater than the radius of the ball as clearly shown in the drawing, and interact with the engaging recesses 9 in member 3 in such a way that when the casing 1 is turned, the balls 8 drive member 3 with parts 4 and 5. The cavities 7 serve to guide or cage the balls 8 at equal arcuate spacings around the axis of rotation of the disc-formed member. The disc-formed member 3 is kept pressed towards the balls by one or more bowl-shaped resilient washers 10 which are compressed between a friction ring 11 movable in the axial direction and set against the underside of member 3 and a stop plate 12 screwed into the casing 1 and encircling the cylindrical part of the stud 4. Friction ring 11 is secured against rotation by a locking pin 13 through the side wall of the casing 1 which protrudes into a corresponding axial groove engaging the periphery of the ring.

When using the device, the tightening-up torque at which the casing 1 begins to rotate relative to component 3 and the stud 4, and the bolt etc., which is being tightened, is determined by (a) The force required to compel the casing 1 and component 3 to move so far away from each other in the axial direction that the ball or balls 8 can roll up and out of the recesses 9, which are drilled to a depth less than the radius of the ball for this purpose.

(b) The force required to overcome the friction between member 3 and the friction ring 11.

By varying the distances through which the bottom stop disc 12 is screwed into the casing 1, the torque at which a relative movement between the casing 1 and the member 3 occurs can be adjusted over a relatively wide range. There is a relatively shallow groove 14 connecting the recesses 9 for guiding the balls as they roll on the component 3.

The invention, of course, is not restricted to the embodiment shown and described here. The construction can be varied in several different ways within the framework of the invention.

I claim:

1. In an adjustable torque tranmsission apparatus for the transmission of torque not to exceed a predetermined maximum; bowl shaped casing means for receiving torque about its central axis; shaft means for transmitting torque about said central axis; said bowl means having a first journal for supporting said shaft means for rotation about said central axis; an annular plate element threadably engaged with the interior of said bowl means and spaced from said first journal, providing a second journal for supporting said shaft means for rotation about said central axis; said shaft means being disposed in said first and second journals and having a flange portion disposed therebetween; said flange portion and said bowl means each having an opposed planar surface perpendicular to said central axis; annular spring means disposed about said shaft means between said annular plate element and said flange portion, biasing said opposed surfaces towards each other; a plurality of pocket-like cavities in said planar surface of said bowl means; a plurality of recesses in said planar surface of said flange portion; a ball disposed within each of said cavities to a depth greater than the radius of said ball, and normally disposed in one of said recesses to a depth less than the radius of said ball; whereby when the applied torque is less than the predetermined maximum each of said balls remains disposed within said respective cavity and in said recess, thereby interlocking said bowl means and said shaft means against relative rotation, and when the applied torque is greater than the predetermined maximum, said ball overcomes the bias of said spring means, camming said planar surfaces apart by rotating out of said recess, while remaining disposed within said cavity, thereby freeing said bowl means and said shaft means for relative rotation.

2. In an adjustable torque transmission apparatus for the transmission of torque not to exceed a predetermined maximum; bowl shaped casing means for receiving torque about its central axis; shaft means for transmitting torque about said central axis; said bowl means having a first journal for supporting said shaft means for rotation about said central axis; an annular plate element threadably engaged with the interior of said bowl means and spaced from said first journal, providing a second journal for supporting said shaft means for rotation about said central axis; said shaft means being disposed in said first and second journals and having a flange portion disposed therebetween; said flange portion and said bowl means each having an opposed planar surface perpendicular to said central axis; annular spring means disposed about said shaft means between said annular plate element and said flange portion, biasing said opposed surfaces towards each other; three cavities in said planar surface of said bowl means and equally spaced around said central axis; a plurality of recesses, equal to a multiple of three, in said planar surface of said flange portion and equally spaced around said central axis; a ball disposed within each of said cavities to a depth greater than the radius of said ball, and normally disposed in one of said recesses to a depth less than the radius of said ball; whereby when the applied torque is less than the predetermined maximum each of said balls remains disposed within said respective cavity and in said recess, thereby interlocking said bowl means and said shaft means against relative rotation, and when the applied torque is greater than the predetermined maximum, said ball overcomes the bias of said spring means, camming said planar surfaces apart by rotating out of said recess, while remaining disposed within said cavity, thereby freeing said bowl means and said shaft means for relative rotation.

References Cited by the Examiner

UNITED STATES PATENTS

| | | | |
|---|---|---|---|
| 1,657,274 | 1/28 | Niedhammer | 64—29 X |
| 2,523,584 | 9/50 | Miller. | |
| 2,587,712 | 3/52 | Dodge | 64—29 |
| 2,760,361 | 8/56 | Ruthinger | 64—29 |
| 2,875,601 | 3/59 | George | 64—29 |
| 3,012,456 | 12/61 | Dracka | 81—52.4 |

FOREIGN PATENTS

| | | |
|---|---|---|
| 1,113,209 | 11/55 | France. |
| 846,352 | 8/60 | Great Britain. |

ROBERT C. RIORDON, *Primary Examiner.*

SAMUEL ROTHBERG, *Examiner.*